July 9, 1968 W. A. MacDONALD 3,391,908
VARIABLE FLOW OPPOSED JET MIXER
Filed March 28, 1966
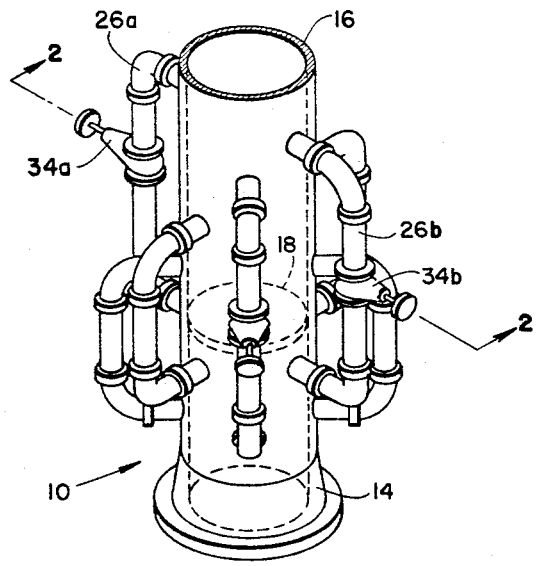
FIG. 1
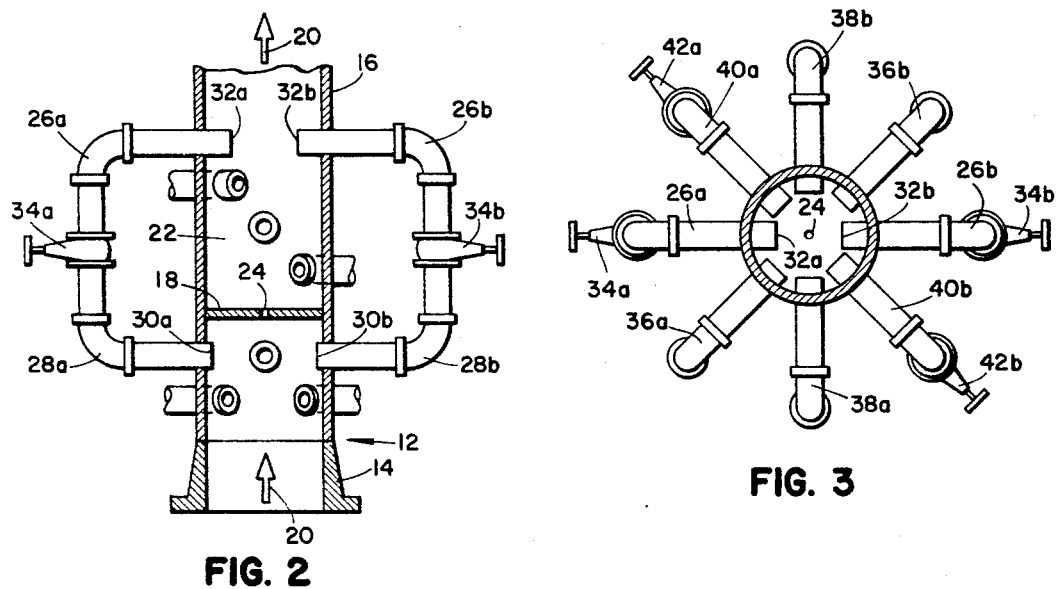
FIG. 2
FIG. 3
William A. MacDonald INVENTOR
BY Donald F. Wohlers
PATENT ATTORNEY

United States Patent Office 3,391,908
Patented July 9, 1968

---

3,391,908
VARIABLE FLOW OPPOSED JET MIXER
William A. MacDonald, Sarnia, Ontario, Canada, assignor to Esso Research and Engineering Company, a corporation of Delaware
Filed Mar. 28, 1966, Ser. No. 537,733
5 Claims. (Cl. 259—4)

ABSTRACT OF THE DISCLOSURE

A fluid mixing device for fluids flowing in a pipe includes an apertured blanking plate blocking direct flow in the pipe and a plurality of bypass conduits exterior of the pipe to bypass fluid from the upstream side of the plate to its downstream side. An array of bypass conduits is provided and operate to produce a plurality of opposed mixing jets on the downstream side of the blocking plate. Valve means are included in selected bypass conduits to regulate the bypass flow velocity of the opposed mixing jets.

---

The present invention relates to fluid mixers.

In particular, the present invention relates to mixers capable of mixing a body of liquid, for example.

One of the primary objects of the present invention is to provide a fluid mixer which will mix a fluid to a predetermined degree and at a predetermined rate while requiring for these results less expenditure of energy than was heretofore required by conventional mechanical mixers for achieving similar results.

Another object of the invention is to provide a fluid mixer which is capable of mixing a fluid as it flows along the interior of a pipe.

Also, it is an object of the invention to provide a mixer which requires no moving parts.

Furthermore, it is an object of the present invention to provide a fluid mixer which can be adjusted so as to be adapted to different rates of fluid flow.

The objects of the invention also include the provision of a mixer of the above type which is exceedingly inexpensive.

Also, it is an object of the invention to provide a mixer which can be installed in any sized process piping, such as piping of the type used in the petroleum industry, for example.

A primary feature of the invention resides in placing in communication with a supply means, which supplies the fluid which is to be mixed, a pair of opposed jet means which respectively terminate in coaxial discharge ends which are spaced from and directed toward each other along their common axis. This pair of opposed jet means direct a pair of jet streams respectively through their discharge ends into collision with each other between these discharge ends to achieve the mixing of the fluid.

The invention is illustrated by way of example in the accompanying drawings which form part of the application and in which:

FIG. 1 is a perspective illustration of one possible embodiment of a fluid mixer according to the invention;

FIG. 2 is a sectional elevation taken along line 2—2 of FIG. 1 in the direction of the arrows; and FIG. 3 is a top plan view of the mixer of FIG. 1.

Referring to the drawings, the mixer 10 which is illustrated therein includes a supply means 12 (FIG. 2) formed by the lower flange portion 14 of a pipe 16, as viewed in the drawings, and a blanking plate 18 extending across the interior of the pipe 16. The fluid is to be considered as flowing upwardly along the interior of the pipe 16, as indicated by the arrows 20 in FIG. 2, and it is clear that the portion 14 of the pipe 16 is situated upstream of the blanking plate 18 while a downstream portion 22 of the pipe 16 is situated above the blanking plate 18. The fluid which flows along the interior of the pipe 16 can be any desired liquid made up of components which are required to be thoroughly mixed. The pipe 16 can be a conventional metal pipe of circular cross section, and the blanking plate 18 can be in the form of a metal disc extending across the interior of the pipe 16 in a plane which is normal to the axis of the pipe 16. This blanking or orifice plate 18 extends completely across the interior of the pipe 16 and is fixed thereto as by welding, for example, so that substantially complete blocking of the flow of fluid beyond the blanking plate 18 is assured. For some purposes it may be desirable to provide the blanking plate 18 with an opening 24 which directs a small flow of liquid at the point of convergence of the opposed jets.

In accordance with the invention, a pair of opposed jet means 26a and 26b (FIG. 2) communicate with the supply means 14. For this purpose the pair of opposed jet means 26a and 26b are in the form of identical bypass conduits 28a and 28b of substantially U-shaped configuration respectively having inlet ends 30a and 30b which are open and which are in free communication with the interior of the pipe 16 at the portion 14 thereof, which is upstream of the blanking plate 18. These open inlet ends 30a and 30b are located relatively close to the inner surface of the pipe 16, as is apparent from FIG. 2.

The pair of opposed jet means 26a and 26b respectively terminate in a pair of coaxial open discharge ends or nozzles 32a and 32b which have their common axis extending along a diameter of the pipe 16 which is normal to the axis of the pipe 16, as is apparent from FIG. 3. The pair of jet means 26a and 26b provide a pair of jet streams which issue from the discharge ends 32a and 32b along their common axis. Since these discharge ends are directed toward and at a given distance from each other, the pair of jet streams will collide with each other to provide a thorough mixing and continue to flow along pipe 16.

Because the pair of opposed jet means 26a and 26b are identical and symmetrically arranged with respect to the axis of the pipe 16, and because they are also identically arranged with respect to the supply means 14, the pair of jet streams which collide with each other between the discharge ends 32a and 32b have identical flow characteristics.

In order to be capable of adjusting the flow, the pair of conduits 28a and 28b respectively carry valves 34a and 34b. It is to be noted that the discharge ends 32a and 32b extend inwardly beyond the inner surface of the pipe 16 by a distance greater than the inlet ends 30a and 30b of the bypass conduits 28a and 28b.

The structure includes additional pairs of identical bypass conduits 36a and 36b, 38a and 38b, and 40a and 40b. The conduits which form each pair are identical with each other, although the identical conduits of any one pair may be differently constructed from the identical conduits of another pair. The several pairs of identical conduits are angularly displaced uniformly about the axis of the pipe 16. All of the inlet ends are situated upstream of the blanking plate 18 and extend slightly into the interior of the upstream portion 14 of the pipe to receive the fluid therefrom. The discharge ends of all of the pairs of pipes extend into the pipe 16 downstream of the plate 18 by distances greater than their inlet ends. It is to be noted that the several discharge ends of the pairs of bypass conduits are respectively situated at different distances from the blanking plate 18 but in each case the ends of any opposed pair are equidistant from the center line of the pipe.

Also, it is to be noted that the pair of diametrically opposed bypass conduits 40a and 40b are respectively provided with control valves 42a and 42b, so that the flow through these conduits can also be controlled. In the particular example illustrated the pairs of opposed bypass conduits 36a, 36b and 38a, 38b do not have any valves so that these conduits are fully open at all times. The other conduits, however, can be completely closed, if desired, so that in this way it is possible to regulate the mixer of the invention to the particular rate of flow which is to be accommodated.

Thus, it will be seen that with the structure of the invention an exceedingly efficient mixing of fluids is achieved by utilizing the kinetic energy of opposed jets of fluid. The structure of the invention is inexpensive since it requires no moving parts and at the same time it can be adjusted for various flow rates. The kinetic energy used for mixing purposes is derived from the opposed jets of fluid which have approximately equal volume and velocity.

As has been indicated above, the structure of the invention can be installed in process piping of any size.

The structure of the invention has been successfully used to replace mechanical mixers in butadiene extraction plants, utilizing less total energy than conventional mechanical mixers while achieving the same extraction efficiency. A particular advantage is achieved by mixing the fluid as it flows along the process pipe 16.

In one particular example, the sizing of the sets of pipes were such that the following conditions prevailed:

Velocity in each jet _____f.p.s__ 15–20
Distance between jets _____ 2.5×jet diam.
Mixing energy _____ft. lbs./gal. of total flow__ 50

As has been indicated above, the blocking valves 34a, 34b and 42a, 42b can be used to block off the flow through one or more sets of pipes when the total flow of fluid to be mixed is reduced to such a level that fewer sets of pipes are required to obtain the desired mixing energy and jet velocity.

While a specific embodiment of the invention has been shown and described in detail to illustrate the application of the inventive principles, it will be understood that the invention may be embodied otherwise without departing from such principles.

What is claimed is:

1. A fluid mixer comprising supply means for supplying the fluid which is to be mixed, and a pair of opposed jet means communicating with said supply means for receiving fluid therefrom, a pipe, said pair of opposed jet means respectively terminating within said pipe in coaxial discharge ends which are directed toward and spaced from each other on an axis normal to the axis of said pipe, said pair of opposed jet means directing through said discharge ends thereof, respectively, a pair of jet streams which collide with each other between said discharge ends of said pair of opposed jet means, said supply means including a portion of said pipe situated upstream of the portion thereof which receives said discharge ends of said pair of opposed jet means, said supply means also including a blanking plate situated in, and extending across, the interior of said pipe upstream of said discharge ends of said pair of opposed jet means for blanking said discharge ends from the interior portion of said pipe upstream of said blanking plate which forms said supply means together with said upstream portion of said pipe, said pair of opposed jet means respectively taking the form of bypass conduits terminating in said discharge ends and respectively having inlet ends communicating with the interior of said pipe upstream of said blanking plate.

2. A mixer as recited in claim 1 and wherein said coaxial discharge ends project inwardly from an inner surface of said pipe along a common transverse diameter of said pipe, and said discharge ends projecting through equal distances inwardly from said inner surface of said pipe.

3. A mixer as recited in claim 1 and wherein said inlet ends of said bypass conduits are situated closer to said inner surface of said pipe than said discharge ends of said bypass conduits.

4. A mixer as recited in claim 1 and wherein said bypass conduits are identical with each other and symmetrically arranged with respect to the axis of said pipe, and said mixer including further pairs of identical diametrically opposed bypass conduits angularly displaced with respect to each other about the axis of said pipe and each having a pair of inlet ends communicating with said pipe upstream of said blanking plate and discharge ends communicating with said pipe downstream of said blanking plate, so that at each pair of identical diametrically opposed bypass conduits there will be a pair of jet streams issuing from their discharge ends into collision with each other.

5. A mixer as recited in claim 4 and wherein the several pairs of discharge ends of the pairs of identical bypass conduits are respectively situated at different distances from said blanking plate.

References Cited

UNITED STATES PATENTS

| | | | |
|---|---|---|---|
| 1,154,868 | 9/1915 | McHenry. | |
| 2,597,422 | 5/1952 | Wood | 259—4 X |
| 2,777,467 | 1/1957 | Powell et al. | 259—4 X |
| 3,157,361 | 11/1964 | Heard | 259—4 X |
| 3,219,483 | 11/1965 | Goos et al. | 259—4 X |

WALTER A. SCHEEL, *Primary Examiner.*

J. M. BELL, *Assistant Examiner.*